United States Patent
Moore

(10) Patent No.: US 6,620,453 B1
(45) Date of Patent: Sep. 16, 2003

(54) CONTROLLED RELEASE NPN RUMINANT FEED COMPOSITION

(75) Inventor: William P. Moore, Hopewell, VA (US)

(73) Assignee: AGRI-Nutrients Technology Group, Inc., Disputanta, VA (US)

( * ) Notice: Subject to any disclaimer, the term of this patent is extended or adjusted under 35 U.S.C. 154(b) by 0 days.

(21) Appl. No.: 10/128,279

(22) Filed: Apr. 24, 2002

(51) Int. Cl.⁷ .................................. A23K 1/22
(52) U.S. Cl. .................... 426/648; 426/2; 426/289; 426/69; 426/807
(58) Field of Search ................. 426/2, 648, 289, 426/69, 807

(56) References Cited

U.S. PATENT DOCUMENTS 6,231,895 B1 * 5/2001 Emanuele et al. ............. 426/2
6,391,454 B1 * 5/2002 Mao et al. .................. 428/407

* cited by examiner

Primary Examiner—Chhaya Sayala

(57) ABSTRACT

A concentrated controlled release non protein nitrogen ruminant feed supplement composition which releases nitrogen in rumen fluids at about the same rate that the nitrogen is metabolized therein. The composition comprises closely sized central particles of concentrated rumen-degradable nitrogen compounds and non-rumen-degradable semipermeable membranes coatingly covering the central particles in an amount sufficient to allow substantially complete diffusion of the degradable nitrogen compound of the central particles through the semipermeable membranes into the rumen fluid in between 6 and 24 hours. A special method to prepare the composition is provided.

13 Claims, No Drawings

CONTROLLED RELEASE NPN RUMINANT FEED COMPOSITION

BACKGROUND OF THE INVENTION

1. Field of the Invention

The present invention relates to ruminant animal nutrition and the utilization of non-protein nitrogen (NPN) chemicals as substitutes for part of the protein in the feed rations of ruminant animals. More particularly, it relates to the discovery that NPN compounds in granular form may be coated with semipermeable layers of certain organic polymer resins to allow the diffusion of the NPN compounds into the rumen fluids at about the same rate as the NPN is metabolized in the rumen. This invention provides for the effective utilization of larger amounts of economical NPN in ruminant feed rations than is possible by the addition of normal NPN compounds which are quickly soluble in rumen fluid. The invention lies in the discovery of the amount and type of semipermeable coating which provides the release (diffusion) of the NPN into the rumen fluid at about the same time as the rumen fluid retention time in the rumen.

2. Description of Related Art

Urea and other ammonia forming chemical compounds such as biuret and ammonium sulfate have been used for many years as economical sources of NPN substitutes for small parts of the protein requirements in the feed rations of ruminant animals. The amount of these compounds which may be safely used has been severely limited because the compounds quickly form ammonia concentrations in the rumen fluid which are high enough to be toxic to the ruminant animal. Ammonia is, converted to amino acids by reaction with carboxylic acids formed from carbohydrates by microbial action in the rumen fluids, and this conversion to carboxylic acids in the rumen is usually unable to keep up with the rapid release of ammonia from substantial amounts of soluble NPN sources. This causes toxic reactions in the animal and poor animal performance.

Rummier, H. J. et al in an article entitled Urea Poisoning and Urea Acceptability Depending Upon the Type of Feed Available to Cattle, Monatsh. Veterinarrmed; 17:102–7 (1962), reported that cattle developed urea poisoning when they consumed 0.49 grams urea/Kg body weight when the urea was mixed in the feed ration. No poisoning-was observed at levels of 0.24 grams urea/Kg weight. The toxic symptoms appeared when blood levels of ammonia reached 0.6 to 1.0 milligram percent (6 to 10 ppm).

Holzshuh, W. et al in an article entitled Investigations on the Catabolism of Non-Protein Nitrogen Compounds in the Rumen, Arch. Tierernaehr. 12:161–178 (1962) reported toxicity symptoms occurred in cattle when ammonia concentrations in the blood reached 0.5 to 1.4 milligram percent (5 to 14 ppm). It was also reported that urea was hydrolyzed completely in 90 minutes in the rumen. When quickly available energy was supplied in the rumen as cellulose and starch, more urea could be tolerated.

Campbell, J. R. et al in an article entitled Effects of Frequency of Feeding on Urea Utilization and Growth Characteristics in Dairy Heifers, J. Dairy Sci. 46:131–4 (1963) reported that Guernsey heifers showed significantly greater body weight gain when fed six times instead of two times per day. The effect was greater when significant urea was included as part of the feed ration.

Andrec, K. in an article entitled The Enhancement of Biosynthesis of Microbial Protein From Urea in Rumen Juice in International Feedstuffs 35(45):50–2, 57–8, 60 (Nov. 2, 1963) reported that urea pelleted with slow release soluble starch releases urea slowly so that the danger of intoxication is reduced. It was reported that 1 gram of urea per Kg body weight could be fed in-vitro and in-vivo in an interval of 5 minutes without causing signs of ammonia intoxication. It was also reported that the soluble starch stimulated fermentation and increased transformation of urea to microbial protein and increased gains in weight and milk production.

Casper, D. P. et al in an article entitled Synchronization of Carbohydrate and Protein Sources on Fermentation and Passage Rates in Dairy Cows, J. Dairy Sci. 82:1779–1790 (1999) showed the importance of having nitrogen release match the availability of energy compounds in the rumen.

Raleigh, R. J. et al in an article entitled Effect of Urea at Different Nitrogen Levels on Digestibility and on Performance of Growing Steers Fed Low Quality Flood Meadow Roughage, J. Animal Science 22:330–4 (1963) reported that when urea was used as a sole supplement to raise crude protein content of a low quality meadow hay roughage from 5.5 to 12.0 percent, highly toxic conditions were created causing fatalities to two steers.

U.S. Pat. Nos. 3,878,304, 3,873,728, and 3,873,733 of Moore disclose that slow release nitrogen products for ruminant feeding were produced by the acid catalyzed reaction of an amide, such as urea, with partially degraded polysaccharides and by agglomeration into strong particles. Urea formaldehyde resins were used in some of the preparations to increase granule integrity.

The prior art has shown the advantage of slow release nitrogen feed to ruminant animals and the need to have ammonia released in the rumen juices at about the rate it is metabolized.

The prior art has not provided a composition which makes practical increasing the amount of concentrated unreacted NPN ammonia-forming nitrogen which may be fed in the rations of ruminant animals, while controlling the release of ammonia forming compounds so that the nitrogen compounds are released at about the same rate that they are metabolized in the rumen fluid.

There are numerous technologies in the art where semipermeable membranes are used to control the release of nitrogen fertilizer compounds in water and soil.

A semipermeable membrane is defined herein as a microporous structure, either natural or synthetic, which acts as a highly efficient filter in the range of molecular dimensions, allowing passage of ions, water, other solvents, and very small molecules but almost impervious to macromolecules and colloidal particles. The semipermeable membranes of interest in the instant invention are thick enough to allow the slow diffusion of soluble molecules and are about 1 to 10 microns thick.

The coatings used for fertilizers release nitrogen compounds in periods of time between one month and one year, several orders of magnitude slower than required for supplying NPN to ruminant animals. The retention times of rumen fluids in the rumen varies somewhat depending upon the animal and the feed rations it receives, but will usually be between 6 and 24 hours. Although the release time for NPN is much shorter than the releases required for nitrogen fertilizers, requirements of high integrity and completeness of the coating of concentrated slow release NPN is much more critical because rapid ammonia release from partially coated nitrogen compounds can cause severe intoxication of ruminant animals.

Emanuele, S. M. et al in U.S. Pat. No. 6,231,895 disclose a ruminant feedstock with a content of non-protein nitrogen supplement which yields a safe controlled-release generation of ammonia under rumen incubation conditions. The non-protein nitrogen comprises urea particles encapsulated with a rumen-degradable polymeric coating. No teaching or suggestion was provided for the use of thin semipermeable membrane coatings to accurately release the soluble NPN nitrogen compounds while the coating shells remain intact. Although no specific amounts of coatings are specified, the examples provided substantial coatings amounting to more than 6 percent of the nitrogen supplement.

OBJECTS OF THE INVENTION

It is therefore an object of this invention to provide a controlled release non protein nitrogen ruminant feed composition which releases nitrogen into rumen fluids at about the same rate that the nitrogen is metabolized therein.

It is another object of this invention to provide a composition with the controlled release non protein nitrogen as central particles of ammonia forming rumen-degradable nitrogen compounds coatingly covered with non-rumen-fluid-degradable resin semipermeable membranes in amounts sufficient to allow the central particles to safely and completely diffuse through the-semipermeable membranes into the rumen fluid in a period of time between 6 and 24 hours, about the same as the rumen fluid retention time in the ruminant animal.

It is another object of this invention to provide a composition containing non-rumen-fluid degradable semipermeable membranes comprising non toxic resins capable of providing the necessary diffusion rates, accurately enough for controlling the NPN diffusion rates.

SUMMARY OF THE INVENTION

I have now discovered that granular concentrated NPN compounds may be coated with thin layers of non-rumen-fluid degradable resins in the form of semipermeable membranes to allow diffusion of the NPN compounds into rumen fluids at about the same rate that the NPN is metabolized in the rumen fluids. The discovery includes the size, composition and nitrogen concentrations of the granules of rumen-fluid-degradable concentrated NPN, and the composition, the thickness, and the amount of the non-rumen-fluid-degradable semipermeable membranes required to provide diffusion into the rumen fluids at about the same rate that the NPN is metabolized. A method of preparing the new composition of this invention is part of the discovery.

The new discovery allows control of the NPN release rates to efficiently respond to changes in metabolism rates caused by differences in the quality of carbohydrates used in the ruminant feed rations, or other causes.

DETAILED DESCRIPTION OF THE INVENTION

The present invention is directed to a controlled release non protein nitrogen (NPN) ruminant feed supplement composition which releases nitrogen into rumen fluids at about the same rate that the nitrogen is metabolized in the rumen fluid. The term metabolize is used herein to mean the conversion of ammonia and organic acids to amino acids, and microbial protein in the rumen fluids of ruminant animals. The ruminant animals for which the new composition is effective include dairy cattle, beef cattle, and sheep.

I have now discovered a concentrated controlled release NPN ruminant feed supplement composition which releases nitrogen in rumen fluids at about the same rate that the nitrogen is metabolized in the rumen fluid. The new composition comprises central particles of rumen-fluid-degradable nitrogen compounds which exhibit diameters between 0.5 and 4.0 millimeters and contain between 20 and 46 percent nitrogen. Particles of nitrogen compounds larger than 4.0 millimeters in diameter do not always move through the rumen in a timely fashion and particles smaller than 0.5 millimeters in diameter frequently release nitrogen in the rumen faster than desired.

In the new composition, non-rumen-fluid-degradable semipermeable membranes coatingly cover the central particles in an amount to allow substantially complete diffusion of rumen-fluid-degradable nitrogen compounds of the central particles through the semipermeable membranes into the rumen fluid in a period of time between 6 and 24 hours. It is required that the semipermeable membranes be non-rumen-fluid degradable so that the NPN compound may be released in a reliable and nearly straight line rate with time. Where rumen fluids degrade the semipermeable membrane, nitrogen compound diffusion increases with time and membrane degradation and release rates increase as degradation occurs. The non-rumen-fluid-degradable membranes are non toxic, small in amount, and pass through the ruminant's digestive system as insoluble fiber.

The amount of time fluids and feed are retained in the rumen of ruminants varies somewhat depending upon the type of animal, the individual animal, and the feed rations it receives. When the diffusion of nitrogen into the rumen fluid is controlled in the range between 6 and 24 hours, utilization of the NPN is efficient and animal ammonia intoxication does not occur.

Rumen-fluid-degradable nitrogen compounds effective as central particles in the concentrated slow release NPN feed supplement include urea, biuret, ammonium acetate, ammonium sulfate, ammonium butyrate, methylene urea, and ammonium salts of amino acids.

The preferred central particles exhibit diameters between 0.6 and 1.4 millimeters and contain between 32 and 46 percent nitrogen.

The non-rumen-fluid-degradable semipermeable membranes of this invention are non-toxic resins. The preferred fully cured resins are polyurethanes, polyolefins, polyesters, polyepoxies, polyvinylidene chlorides, silicones, and mixtures of these resins.

The semipermeable membranes may comprise a single layer or a plurality of layers applied to the central particles. One of the effective compositions is obtained wherein the semipermeable membranes comprise resins applied in dilute solutions or emulsions, and dried by evaporating the liquid, leaving layers of resin coatingly covering the central particles.

The semipermeable membranes may alternatively comprise resins formed in-situ by reacting an excess of a monomer with the central particles and then reacting the excess monomer with another monomer reactive therewith to form organic polymeric resin semipermeable membranes reacted with, and to, the central particles.

The composition of this invention is particularly effective when the semipermeable membrane layers comprise resins applied to the central particles at pressures lower than 300 millimeters of mercury absolute. The semipermeable membranes applied at low pressures are drawn into cavities and rough places on the surfaces of the central particles. This method provides complete coverage of particle surfaces with minimum amounts of coating materials. The amount of semipermeable membranes required is lower than the coatings required in the prior art. No wax or oil sealer is required in the present invention as in the prior art coatings of rumen degradable materials. The semipermeable membranes coatingly covering the central particles of the instant invention amount to between 0.3 and 10.0 percent and preferably between 1.0 and 5.0 percent.

A preferred concentrated non protein nitrogen (NPN) animal feed supplement composition for ruminant animals of this invention completes its release of nitrogen into rumen fluids in about the same time that the rumen fluid is retained in the rumen by a ruminant animal. The composition comprises central spheroid particles of urea exhibiting diameters between 0.4 and 1.5 millimeters. Non-rumen-fluid-degradable semipermeable membranes coatingly cover the spheroid urea particles as a plurality of layers comprising polyurethane resin with the layers applied at a pressure between 40 and 150 millimeters of mercury absolute as a water emulsion containing between 30 and 55 percent polyurethane resin and dried by evaporating the water therefrom. The semipermeable membranes amount to between 1 and 5 percent by weight of the urea and allow substantially complete diffusion of the urea from the central spheroid particles through the semipermeable membrane into the rumen fluid in a period of time between 6 and 24 hours.

To effectively prepare the composition of this invention, a stepwise method is preferred wherein spheroid urea particles exhibiting diameters between 0.4 and 1.5 millimeters are charged to a coating device which rolls the urea spheroid particles and maintains a temperature therein between 70 and 100° C. A water emulsion containing between 30 and 55 percent polyurethane resin is sprayed onto the urea particles rolling in the coating device in doses containing urethane amounting to between 0.3 and 1.0 percent of the urea per dose, and evaporating the water from the emulsion at an absolute pressure of between 40 and 150 millimeters of mercury after each dose. Spraying and evaporating is continued until a plurality of polyurethane resin layers coatingly cover the spheroid urea particles with semipermeable membrane amounting to between 1 and 5 weight percent of the urea which allows the substantially complete diffusion of the urea from the spheroid urea particles into rumen fluid in a period of time between 6 and 24 hours.

MODE OF OPERATION OF THE INVENTION

Having described the basic concepts of the instant invention, reference is now made to the following examples which are provided to illustrate the preparation, the analyses, and the effectiveness of the composition of the instant invention.

EXAMPLE 1

This example demonstrates the preparation of concentrated controlled release non protein nitrogen ruminant feed supplement under vacuum.

A stainless steel 8 cubic foot capacity Gemco batch double cone vacuum dryer, jacketed for steam heating and water cooling, and equipped with a liquid spray bar running along the center of horizontal rotation of the dryer, was charged with 160 pounds of urea granules, passing through a 14 mesh U.S. Sieve Standard screen (1.41 mm screen opening) and retained on a 30 mesh screen (0.59 mm screen opening) at 90° C.

Rotation was started on the double cone dryer at a rate of 20 rpm. A liquid resin mixture comprising 96 percent Witcobond W-170 Urethane Latex and 4 percent Cymel 373 liquid crosslinking agent were premixed. The Witcobond W-170 Urethane Latex contained fully cured urethane resin amounting to 35 percent, no solvent, and water, exhibiting a viscosity of 30 centipoise at 25° C. The Cymel 373 comprised methoxy metholated melamine.

A vacuum system connected to the double cone dryer was started and the pressure in the double cone dryer and the urea granules therein was reduced to 40 millimeters of mercury absolute. The liquid resin mixture amounting to 2.2 pounds (containing 0.8 dry matter) was introduced through the liquid spray bar of the double cone dryer throughout a 2 minute period. Rotation was continued in the double cone dryer for 5 minutes at a temperature between 75 and 90° C. to allow the liquid resin to dry this first dose of resin into a layer of semipermeable membrane.

The introduction of liquid resin mixture was repeated until 5 doses of resin had been introduced, providing a total of 4.0 pounds of dry matter added to the urea granules. The coated urea was retained for 15 minutes at 80° C. under vacuum after the last dose of liquid resin, and then cooled to 40° C. and discharged at atmospheric pressure.

Analysis of the coated urea showed a nitrogen content of 44.0 percent (275 percent protein equivalent). A sample of the product was placed in a Waring Blender with clarified rumen fluid, ground, and allowed to sit for 16 hours. Dry matter was determined on that sample to be 2.88 percent which is the same coating weight determined in water by the same procedure. This analysis indicated that the coating was non-rumen-fluid degradable.

Granules of the coated urea were split and electromicrographs were taken of cross sections of the granules so that thicknesses of membrane coatings could be estimated. The membranes were contiguous over the whole granules and were between 1 and 4 microns thick.

EXAMPLE 2

This example demonstrates the controlled release of the concentrated non protein nitrogen ruminant feed supplement composition into rumen fluids at about the same rate that the nitrogen is metabolized therein, and that the release is much slower and safer than from uncoated urea.

Rumen fluid was collected from a fistulated Holstein cow through a filter cloth and was buffered with three parts of sodium phosphate solution per part of rumen fluid. Isonitrogenous ammonia release experiments were carried out using a high energy formulation containing molasses, animal fat, Brewers yeast, and refined cellulose in samples of feed urea, the controlled release non protein nitrogen feed supplement of Example 1, and soybean meal. The total amount of nitrogen in each of the 150 milliliter in-vitro fermentation samples was 3.0 grams. The fermentation samples were maintained at 39° C. and oxygen was expunged from the samples by carbon dioxide. The samples were sampled after 0, 1, 2, 3, 8 and 20 hours, and analyzed for ammonia nitrogen. The results are tabulated as follows:

| Nitrogen Source | NH₃ Concentration in Buffered Rumen Fluid, mg/liter | | | | | |
|---|---|---|---|---|---|---|
| | 0 hr | 1 hr | 2 hrs | 3 hrs | 8 hrs | 20 hrs |
| Feed urea, 45% N | 42 | 8030 | 16100 | 12200 | 10800 | 7600 |
| Example 1, 44% N | 50 | 450 | 1260 | 1760 | 3530 | 6720 |
| Soybean Meal, 9.1% N | 61 | 380 | 1120 | 2400 | 4070 | 7160 |

EXAMPLE 3

This example demonstrates that the concentrated controlled release non protein nitrogen ruminant feed supplement compositions of this invention are coatingly covered with non-rumen-fluid-degradable semipermeable membranes which allow the substantially complete diffusion of rumen-fluid degradable nitrogen compounds through the semipermeable membranes into rumen fluid in a period of time between 6 and 24 hours.

Samples weighing 10 grams each of feed urea (45% N) and Example 1 product (44% N) were suspended in the rumen of a large fistulated Holstein cow. There were two samples of feed urea and four samples of the Example 1 product. Samples were removed after 6 and 24 hours. The urea samples removed at both 6 and 24 hours were completely dissolved leaving no residue.

The two samples of Example 1 product removed after 6 hours were washed, dried, and found to consist of coatings filled with wet urea. After drying, the samples were weighed. The weights indicated that about one-half of the urea remained in the coatings (shells).

The two samples of Example 1 product removed after 24 hours after washing comprised shells of resin semipermeable membranes filled with rumen fluids, primarily water, and substantially no undissolved urea.

I claim:

1. A concentrated controlled release non protein nitrogen ruminant feed supplement composition which releases nitrogen in rumen fluids at about the same rate that the nitrogen metabolizes therein, the composition comprising:
   (a) central particles of rumen-fluid-degradable nitrogen compounds, exhibiting diameters between 0.5 and 4.0 millimeters, and containing between 20 and 46 percent nitrogen; and,
   (b) non-rumen-fluid-degradable semipermeable membranes coatingly covering the central particles in an amount sufficient to allow substantially complete diffusion of the rumen-fluid-degradable nitrogen compound of the central particles through the semipermeable membranes into the rumen fluid in a period of time between 6 and 24 hours.

2. The composition of claim 1 wherein the central particles of rumen-fluid-degradable nitrogen compounds are selected from the group consisting of urea, biuret, ammonium acetate, ammonium sulfate, ammonium-butyrate, methylene urea, and ammonium salts of amino acids.

3. The composition of claim 1 wherein the central particles exhibit diameters between 0.6 and 1.4 millimeters.

4. The composition of claim 1 wherein the central particles contain between 32 and 46 percent nitrogen.

5. The composition of claim 1 wherein the non-rumen-fluid-degradable semipermeable membranes are non toxic resins selected from the group consisting of polyurethanes, polyolefins, polyesters, polyepoxies, polyvinylidine chlorides, silicones and mixtures thereof.

6. The composition of claim 1 wherein the semipermeable membranes comprise a single layer or a plurality of layers.

7. The composition of claim 1 wherein the semipermeable membranes comprise resins applied in dilute liquid solutions or emulsions and dried by evaporating the liquid leaving layers of resin coatingly covering the central particles.

8. The composition of claim 1 wherein the semipermeable membranes comprise resins formed in-situ by reacting an excess of a monomer with the central particles and then reacting the excess monomer with another monomer reactive therewith to form organic polymer semipermeable membranes reacted with and to the central particles.

9. The composition of claim 1 wherein the semipermeable membrane layers comprise resins applied to the central particles at pressures lower than 300 millimeters of mercury absolute.

10. The composition of claim 1 wherein the semipermeable membrane coatingly covering the central particles amounts to between 0.3 and 10.0 percent by weight of the central particles.

11. The composition of claim 1 wherein the semipermeable membrane coatingly covering the central particles amounts to between 1.0 and 5.0 percent by weight of the central particles.

12. A concentrated non protein nitrogen animal feed supplement composition for ruminant animals which completes its release of nitrogen into rumen fluids in about the same time that the rumen fluid is retained in the rumen by the ruminant animal, the composition comprising:
   (a) central spheroid particles of urea exhibiting diameters between 0.4 and 1.5 millimeters; and,
   (b) non-rumen-fluid-degradable semipermeable membranes coatingly covering the spheroid urea particles as a plurality of layers comprising polyurethane resin, the layers applied at a pressure of between 40 and 150 millimeters of mercury absolute as a water emulsion containing between 30 and 55 percent polyurethane resin and dried by evaporating the water therefrom, the, semipermeable membranes amounting to between 1 and 5 percent by weight of the urea to allow substantially complete diffusion of the urea from the central spheroid particles through the semipermeable membrane into the rumen fluid in a period of time between 6 and 24 hours.

13. The feed composition of claim 12 prepared by a stepwise method comprising:
   (a) charging spheroid urea particles exhibiting diameters between 0.4 and 1.5 millimeters to a coating device which rolls the urea spheroid particles and maintains a temperature therein between 70 and 100° C.;
   (b) applying a water emulsion containing between 30 and 55 percent polyurethane resin onto the urea particles rolling in the coating device in doses containing polyurethane amounting to between 0.3 and 1.0 percent of the urea per dose and evaporating the water from the emulsion at an absolute pressure of between 40 and 150 millimeters of mercury after each dose; and,
   (c) continuing to spray and evaporate until a plurality of polyurethane resin layers coatingly cover the spheroid urea particles with semipermeable membrane amounting to between 1 and 5 weight percent of the urea which allows the substantially complete diffusion of the urea from the spheroid urea particles into rumen fluid in a period of time between 6 and 24 hours.

* * * * *